(12) United States Patent
Malmquist (10) Patent No.: US 12,202,746 B1
(45) Date of Patent: Jan. 21, 2025

(54) WATER RECLAMATION SYSTEM

(71) Applicant: Mark Malmquist, Anacortes, WA (US)

(72) Inventor: Mark Malmquist, Anacortes, WA (US)

(*) Notice: Subject to any disclaimer, the term of this patent is extended or adjusted under 35 U.S.C. 154(b) by 0 days.

(21) Appl. No.: 18/794,594

(22) Filed: Aug. 5, 2024

Related U.S. Application Data (60) Provisional application No. 63/620,081, filed on Jan. 11, 2024.

(51) Int. Cl.
| | |
|---|---|
| *C02F 1/44* | (2023.01) |
| *B01D 61/04* | (2006.01) |
| *B01D 65/08* | (2006.01) |
| *C02F 103/00* | (2006.01) |

(52) U.S. Cl.
CPC .............. *C02F 1/441* (2013.01); *B01D 61/04* (2013.01); *B01D 65/08* (2013.01); *C02F 2103/002* (2013.01); *C02F 2201/002* (2013.01); *C02F 2301/024* (2013.01)

(58) Field of Classification Search
CPC ............... C02F 1/441; C02F 2103/002; C02F 2201/002; C02F 2301/024; B01D 61/04; B01D 65/08
See application file for complete search history.

(56) References Cited

U.S. PATENT DOCUMENTS

| | | | |
|---|---|---|---|
| RE25,324 E | 1/1963 | Cottell | |
| 3,206,397 A * | 9/1965 | Harvey | B01D 61/025 |
| | | | 134/1 |
| 4,990,260 A | 2/1991 | Pisani | |
| 10,934,185 B2 * | 3/2021 | Schulze | C02F 1/34 |
| 2008/0257828 A1 * | 10/2008 | Kelsey | C02F 1/34 |
| | | | 210/259 |
| 2013/0161262 A1 | 6/2013 | Henley | |
| 2015/0144566 A1 | 5/2015 | Wallace | |
| 2015/0239752 A1 | 8/2015 | Tulloch | |
| 2016/0016834 A1 | 1/2016 | Dahule | |
| 2017/0008779 A1 | 1/2017 | Profit | |
| 2019/0344221 A1 * | 11/2019 | Smith | B01D 65/08 |

FOREIGN PATENT DOCUMENTS

WO     2018111284 A1     6/2018

OTHER PUBLICATIONS

"Cavitation in Restriction Orifices and Valves", Neutrium, Aug. 17, 2012, 9 pages. Retrieved from the Internet: <URL:https://neutrium.net/fluid_flow/cavitation-in-restriction-orifices/>.

Kendall, Tom, "Waterhammer/Cavitation Assessment & Prevention", Wisconsin Electric, 2017, 22 pages. Retrieved from the Internet: <URL:https://www.nrc.gov/docs/ML0307/ML030700448.pdf>.

(Continued)

*Primary Examiner* — Terry K Cecil
(74) *Attorney, Agent, or Firm* — DANE IP Law PC (57) ABSTRACT

An orifice cavitation device is disclosed herein which promotes cavitation at low operating pressures. An output opening has a sharp edge which facilitates cavitation. Moreover, an inner perimeter length may be increased by forming notches in the opening. Also, grooves may be formed on the inner surface of a funnel of the orifice cavitation device. The grooves may be straight and also spiral or slanted to encourage the water to rotate and increase shearing forces which also facilitates cavitation.

18 Claims, 11 Drawing Sheets

(56) References Cited

OTHER PUBLICATIONS

Zhou et al., "On the role of cavitation in particle collection in flotation—A critical review. II", Minerals Engineering 22 (2009) 419-433.
Dular et al., "Use of hydrodynamic cavitation in (waste)water treatment", larUltrasonics Sonochemistry 29 (2016) 577-588.
Byrne, Robert Howard, Duxbury, Alyn C. and Mackenzie, Fred T.. "seawater". Encyclopedia Britannica, Apr. 28, 2022, https://www.britannica.com/science/seawater Accessed Dec. 3, 2022. (Year: 2022).

* cited by examiner

WATER RECLAMATION SYSTEM

CROSS REFERENCE TO RELATED APPLICATIONS

This application claims priority to Prov. Pat. App. Ser. No. 63/620,081, filed on 2024 Jan. 11, the entire contents of which are expressly incorporated herein by reference.

This application is also related to U.S. Ser. No. 16/923,682, filed on 2020 Jul. 8, U.S. Ser. No. 15/969,067, filed on 2018 May 2, and U.S. Ser. No. 62/501,991, filed on 2017 May 5, the entire contents of which are expressly incorporated herein by reference.

STATEMENT RE: FEDERALLY SPONSORED RESEARCH/DEVELOPMENT

Not Applicable.

BACKGROUND

The various aspects and embodiments disclosed herein relate to a water treatment center.

A water treatment center processes lower quality water (e.g. seawater or non-potable groundwater) through a reverse osmosis system. The reverse osmosis system will be able to process the lower quality water so that about 80% of the non-potable water is sent to the end-user while the other 20% of the non-potable water is dumped back into the environment. The process water that is sent to the end user is often referred to as permeate water. The potable water that is not potable and dumped back into the environment is often referred to as concentrate water.

There is a need in the art for reducing the amount of concentrate being introduced into the environment which has a higher concentration of minerals that might damage the environment than the lower quality water being processed.

BRIEF SUMMARY

A water purification system is disclosed. The system may cavitate water from the concentrate line of a reverse osmosis plant to further recapture the waste water. The water may be cavitated with an orifice cavitation device which has a low operating pressure. By way of example and not limitation, the orifice cavitation device disclosed herein may cavitate water as low as 100 pounds per square inch (psi). This is accomplished by forming a cone shaped funnel in the orifice cavitation device. A distal end (i.e., downstream side) of the cone shaped funnel may have a sharp edge for cavitating the water. Moreover, the surface of the cone shaped funnel may have grooves to increase a linear length of a downstream opening of the cone shaped funnel. These grooves may be formed as a spiral to rotate the water as the water passes through the orifice cavitation device. The rotation of the water creates additional shear forces to further allow for cavitation of the water. The volume spacer may be disposed in the space defined by the cone shaped funnel to further increase a velocity of the water exiting the downstream opening of the cone shaped funnel. The cavitated concentrate line may be processed by a second reverse osmosis unit to further recycle the water processed by the water purification system compared to the amount of water that can be recycled solely by the main reverse osmosis plant.

More particularly, a reverse osmosis plant for producing potable water from nonpotable water is disclosed herein.

The reverse osmosis plant may comprise a hydrodynamic cavitation unit, a pump and a reverse osmosis unit. The hydrodynamic cavitation unit may receive nonpotable water from a main reverse osmosis plant. The hydrodynamic cavitation unit may output cavitated nonpotable water from an output port of the hydrodynamic cavitation unit. The nonpotable water may be pressurized to a pressure below 100 pounds per square inch throughout an entire flow path of the hydrodynamic cavitation unit.

The hydrodynamic cavitation unit may comprise a body having a cone shaped funnel with an orifice disposed at a downstream side of the body. The orifice may have an edge for facilitating cavitation of the nonpotable water as the nonpotable water flows downstream of the edge of the body. The pressure of the nonpotable water may be below 100 pounds per square inch before and after water flows through the orifice.

The pump may be connected to the output port of the hydrodynamic cavitation unit for receiving the cavitated nonpotable water. The pump may have an output port for delivering the cavitated nonpotable water at a pressure greater than 200 pounds per square inch.

The reverse osmosis unit may be connected to the output port of the pump for receiving the cavitated nonpotable water at a pressure greater than 200 pounds per square inch and producing the potable water.

The cone shaped funnel may terminate at the edge. The cone shaped funnel may have one or more grooves that extend from an upstream side to the edge of the body. The one or more grooves may be straight. Alternatively, the one or more grooves may have a spiral configuration. A radius of the spiral configuration of the one or more grooves may increase from the edge of an upstream side of the body. The increase may be linear or progressive.

The hydrodynamic cavitation unit may further comprise a bulbous body (i.e., volume spacer) defining a proximal end, a distal end and a central axis. The central axis of the bulbous body may be coaxially aligned to a central axis of the cone shaped funnel of the body. The distal end of the bulbous body may be aligned to the edge of the orifice. An external surface of the bulbous body may have one or more grooves that extend lengthwise along the central axis of the bulbous body.

The bulbous body may also have one or more grooves. These grooves on the bulbous body may be straight. Alternatively, the grooves on the bulbous body may have a spiral configuration. One or more grooves may be formed on the cone shaped funnel. The one or more grooves on the bulbous body may have a spiral configuration. A direction of the spiral configuration of the one or more grooves of the bulbous body may be opposite a direction of the spiral configuration of the one or more grooves of the cone shaped funnel.

In another aspect, a method of producing potable water from nonpotable water is disclosed. The method may comprise the steps of flowing nonpotable water through a hydrodynamic cavitation unit; pressurizing the nonpotable water to a pressure under 100 pounds per square inche to direct the nonpotable water through a cone shaped funnel of the hydrodynamic cavitation unit; creating a reduction in pressure between an upstream pressure and a downstream pressure to an orifice to cavitate the nonpotable water; receiving the cavitated nonpotable water in a reverse osmosis unit; pressurizing the cavitated nonpotable water to a pressure greater than 200 pounds per square inch; and flowing the pressurized and cavitated nonpotable water through the reverse osmosis unit to produce the potable water.

The method may further comprise the step of rotating the nonpotable water about a central axis of the cone shaped funnel as the nonpotable water flows through the cone shaped funnel.

In the method, the step of rotating the nonpotable water may comprise the step of increasing a rate of rotation as the nonpotable water flows downstream through the cone shaped funnel.

The method may further comprise the step of reducing a volume of the cone shaped funnel to increase a speed of the nonpotable water through the orifice.

In another aspect, a hydrodynamic cavitation unit which cavitates nonpotable water is disclosed. The hydrodynamic cavitation unit may comprise a body. The body may have a cone shaped funnel with an orifice disposed at a downstream side of the body. The orifice may have an edge for facilitating a cavitation of the nonpotable water as the nonpotable water flows downstream of the edge of the body. A pressure of the nonpotable water may be below 100 pounds per square inch before and after water flow through the orifice.

The cone shaped funnel may terminate at the edge.

The cone shaped funnel may have one or more grooves that extend from an upstream side to the edge of the body. The one or more grooves may be straight. Alternatively, the one or more grooves may have a spiral configuration. A radius of the spiral configuration of the one or more grooves may increase from the edge of an upstream side of the body to the edge. The increase may be linear or progressive.

The hydrodynamic cavitation unit may further comprise a bulbous body defining a proximal end, a distal end and a central axis. The central axis of the bulbous body may be coaxially aligned to a central axis of the cone shaped funnel of the body. A distal end of the bulbous body may be aligned to an edge of the orifice.

An external surface of the bulbous body may have one or more grooves that extend lengthwise along the central axis of the bulbous body. The one or more grooves on the bulbous body may be straight. The one or more grooves on the bulbous body may have a spiral configuration.

A direction of the spiral configuration of the one or more grooves of the bulbous body may be opposite a direction of the spiral configuration of the one or more grooves of the cone shaped funnel.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
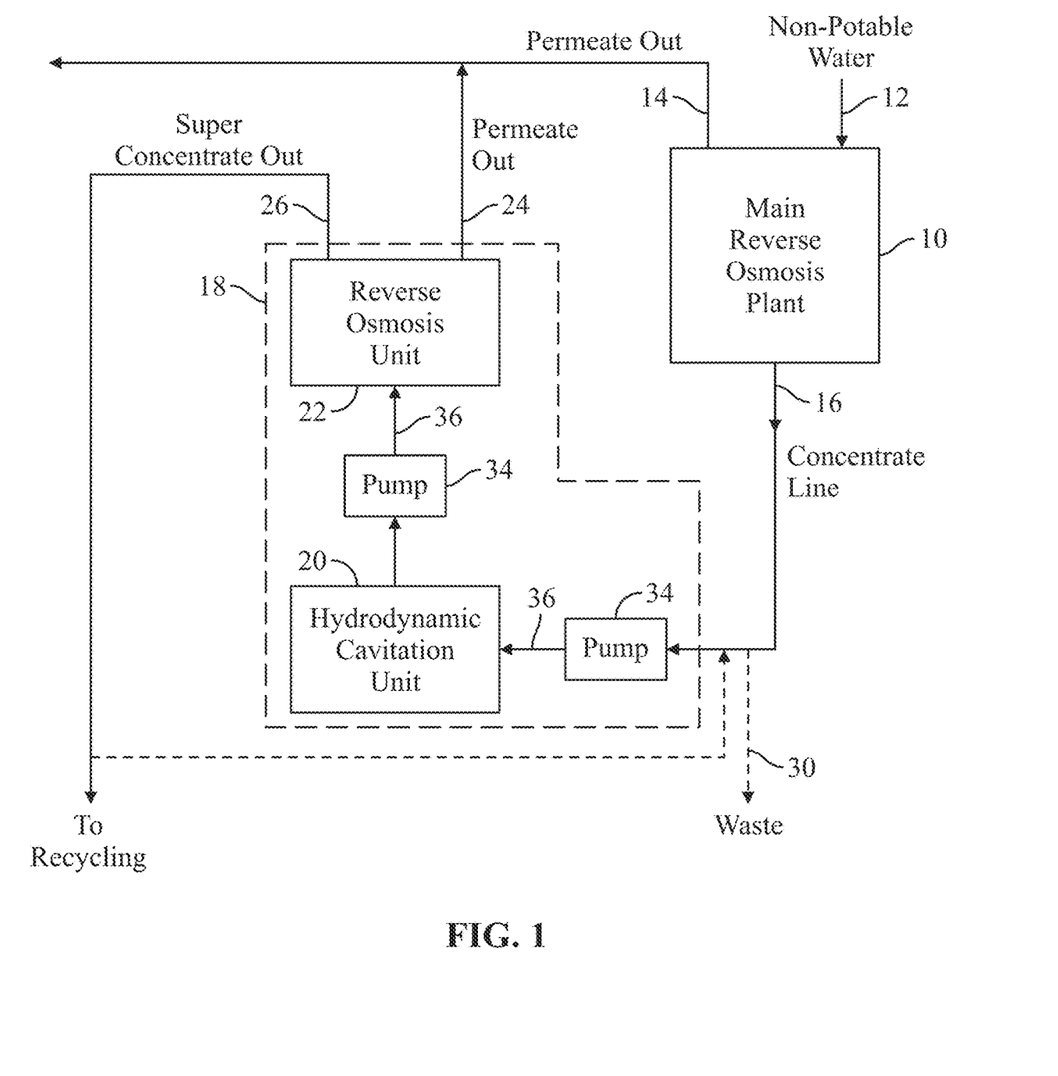
FIG. 1 is a schematic view of a reverse osmosis plant.

Referring now to FIG. 1, a reverse osmosis main plant 10 is shown. The reverse osmosis main plant 10 may receive non-potable water 12 and discharge out permeate through the permeate out line 14 and concentrate through the concentrate line 16. Typically, about 20% of the non-potable water is discharged out of the concentrate line 16 as concentrate. A concentrate processing system 18 may receive the concentrate out of the concentrate line 16. The concentrate has a higher level or concentration of minerals compared to the non-potable water. The concentrate may subsequently be processed with a hydrodynamic cavitation unit 20 at a low pressure (e.g., below 100 psi). After cavitation by the hydrodynamic cavitation unit 20, the cavitated water may subsequently be pumped into the reverse osmosis unit 22 at a high pressure (e.g, above 200 psi) to process the cavitated water by a reverse osmosis unit 22. The reverse osmosis unit 22 produces permeate water and discharges the permeate water through the permeate out line 24 and may join the permeate out line 14 of the reverse osmosis main plant 10. The permeate water from the reverse osmosis unit 22 and the reverse osmosis main plant 10 may be treated then sent to the end user for consumption. For example, after water treatment, the water may be consumed by people.

The reverse osmosis unit 22 may have a concentrate out line 26 which may be referred to as a super concentrate line 26 because the concentration of minerals in the super concentrate is higher than the concentration of minerals discharged from the concentrate line 16 of the reverse osmosis main plant 10.

The hydrodynamic cavitation unit 20 changes the molecular structure of the concentrate out of the reverse osmosis main plant 10 so that the unwanted minerals do not foul a membrane of the reverse osmosis unit 22. Rather, the change in the molecular structure of the concentrate reduces the amount of minerals that might foul or attach to the membrane of the reverse osmosis unit 22. Additionally, mitigation of the minerals from attaching to the membrane of the reverse osmosis unit 22 is also due to the high pressure in which the reverse osmosis unit 22 operates. By way of example and not limitation, the cavitated water may experience pressures above 200 psi and more preferably between 300 to 400 psi in the reverse osmosis unit 22. Cavitation of the concentrate water from the concentrate line 16 of the main plant reverse osmosis along with the high pressure induced on the cavitated water reduces the amount of minerals that would have attached to the membrane of the reverse osmosis unit 22.

By mitigating or reducing the amount of minerals that attach to the membrane of the reverse osmosis unit 22, the lifespan of the reverse osmosis unit 22 is extended. Moreover, the reverse osmosis unit 22 produces a super concentrate coming out of the super concentrate out line 26. The minerals in the super concentrate begin to form as undissolved solids (e.g., hydrophobic material) so that the super concentrate from the super concentrate line 26 can be sent to recycling for removal of the undissolved solids and eventually sold to an end user.

The hydrodynamic cavitation unit 20 may cavitate the concentrate water at temperatures at or around 3000° F. or more (e.g., 4000° F.) and pressures at or around 75 psi to 100 psi or more. The hydrodynamic cavitation unit 20 may be a rotary shear type cavitation unit, a shear plate type cavitation unit or an orifice type cavitation unit.

The concentrate processing system 18 may receive the concentrate from the reverse osmosis main plant 10 and more than 20% and typically about 50% of the concentrate may be discharged out to the permeate out line 24. The other 50% is considered a super concentrate and sent to recycling to capture or remove the undissolved solids, minerals that are valuable and contained within the super concentrate of the concentrate processing system 18. The undissolved solids and minerals may include one or more of the following but are not limited to calcium sulfate, calcium, potassium, magnesium, sulfur, phosphorus and selenium.

It is also contemplated that the super concentrate from the super concentrate out line 26 may be recycled back to the hydrodynamic cavitation unit 20 through return line 28. Additionally, the concentrate from the concentrate line 16 may be diverted away from the concentrate processing system 18 to waste 30.

The undissolved solids from the super concentrate of the super concentrate out line 26 may be a hydrophobic solid that can be removed and recycled for further use.

The cavitated water in lieu of being processed with a reverse osmosis unit 22 may be subjected to high pressures which would begin to solidify the minerals as a hydrophobic material. In this instance, no permeate water is produced but the minerals in hydrophobic solid form may be removed and recycled for further use.

It is also contemplated that a hydrodynamic cavitation unit may be placed upstream from the reverse osmosis main plant 10 in order to mitigate fouling of the membrane of the reverse osmosis main plant 10 which may increase life and uptime of the reverse osmosis main plant 10.

Other ways of producing the hydrophobic solid is by running a DC current through the super concentrate via an anode and a cathode. The hydrophobic solid will collect on the anode. The electricity may be shut off and the material with be captured off of the anode.

Figure 2:
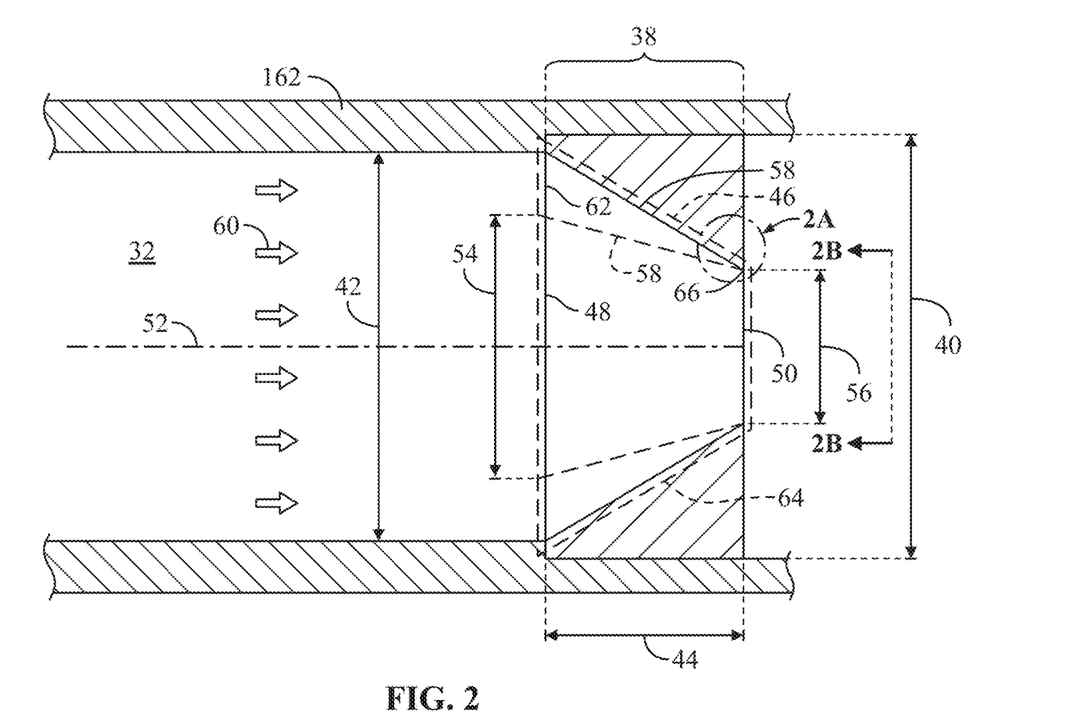
FIG. 2 is a cross sectional view of an orifice cavitation unit.

Referring now to FIG. 2, a cross-section of the hydrodynamic cavitation unit 20 is shown. The hydrodynamic cavitation unit 20 receives non-potable water from the concentrate line 16 being outputted from the main reverse osmosis plant 10. The non-potable water being outputted from the main reverse osmosis plant 10 through the concentrate line 16 may be pressurized to a pressure below 100 psi. This may be accomplished with pump 34. The maximum operating pressure of the hydrodynamic cavitation unit 20 may be 100 psi. After the non-potable water from the concentrate line 16 is pumped to a higher pressure, the pressurized water is introduced into the hydrodynamic cavitation unit 20 via line 36 (see FIGS. 1 and 2). The cross-sectional view of the hydrodynamic cavitation unit 20 shows a pipe 36 and an inline orifice cavitation device 38. The orifice cavitation device 38 may have an outside diameter 40 which may be slightly larger than an inside diameter 42 of the pipe 36. Alternatively, the outside diameter 40 of the orifice cavitation device 38 may be equal to an inside diameter 42 of the pipe 36.

Moreover, the orifice cavitation device 38 may have a thickness 44. The orifice cavitation device 38 may also have a cone-shaped funnel 46. The cone-shaped funnel 46 may have a round upstream opening 48 and a round downstream opening 50 when viewed axially as shown in FIG. 2B. The upstream and downstream openings may each define a center and be coaxially aligned to each other and also aligned to a central axis 52 of the pipe 36. The round upstream opening may define an inner diameter 54 and the round downstream opening 50 may define an inner diameter 56. The inner diameter 54 of the round upstream opening 48 may be greater than the inner diameter 56 of the round downstream opening 50. The cone-shaped funnel 46 may have a straight oblique cone-shaped surface 58. The surface 58 may be oblique to the central axis 52 of the pipe 36 when the orifice cavitation device 38 is mounted in the pipe 36.

As shown in FIG. 2, for example, the cavitated non-potable water 32 flows in the direction from left to right as indicated by arrow 60. The inner diameter 42 of the inner surface 59 of the pipe 36 may be equal to the inner diameter 54 of the round upstream opening 48.

Alternatively, the orifice cavitation device 38 may have a flat edge 62 which stops the water 32 from flowing straight into the cone-shaped funnel 46. The reason is that the inner diameter 54 (see dashed dimension line 54) may be less than the inner diameter 42.

As the non-potable water from the concentrate line 16 is pushed through the orifice cavitation device 38, the non-potable water 32 is forced through the cone-shaped funnel 46. The pressure of the non-potable water 32 upstream of the orifice cavitation device 38 may be 100 psi or lower. As the non-potable water 32 proceeds through the cone-shaped funnel 46 of the orifice cavitation device 38, the velocity of the water increases.

Figure 2A:
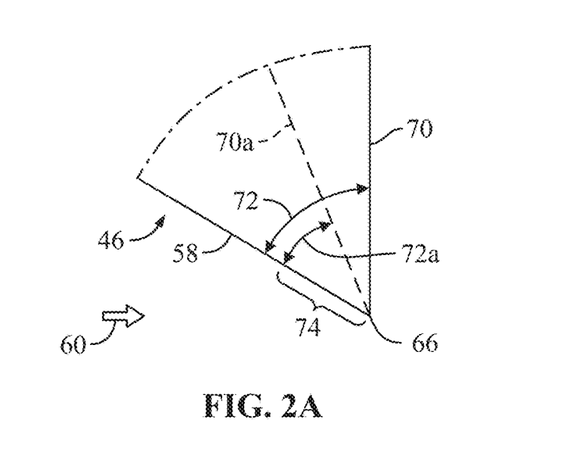
FIG. 2A is an enlarged view of an edge of a downstream opening of an orifice cavitation device.
Figure 2B:
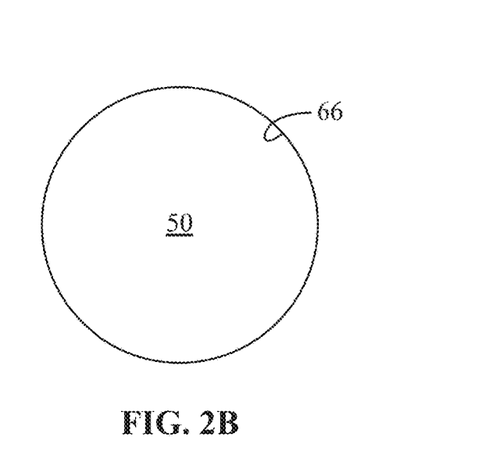
FIG. 2B is a front view of the edge of the downstream opening of the orifice cavitation device shown in FIG. 2.

The downstream opening 50 may have a sharp edge 66 as shown in FIGS. 2 and 2A. The water flows in the direction of arrow 60 shown in FIG. 2A as the water is funneled through the downstream opening 50, the water is further constricted by the surface 58 of the cone shaped funnel 46. The velocity of the water speeds up and when the water passes over the edge 66 the reduction in pressure upstream of the edge 66 to downstream of the edge 66 causes the water to cavitate. The sharp edge causes shear forces to act upon the water after it passes the edge 66. The edge 66 is defined by the surface 58 of the cone shape funnel 46 and the downstream surface 70 of the orifice cavitation device 38. To sharpen the edge, the downstream surface 70 may be undercut as shown by the dash line 70A as shown in FIG. 2A. The angle 72, 72A between the surface 58 of the cone shape funnel 46 and the downstream surface 70 may be by way of example and not limitation between 10 degrees to 60 degrees. Moreover, a radius of the tip of the edge 66 may be by way of example and not limitation between 0.001 inches to 0.010 inches. Referring now to FIG. 2B, a length of the edge 66 is defined by a circumference of the round downstream opening 50. To increase cavitation, the speed of the water passing over the edge or by the edge 66 may be increased, the length of the edge 66 may also be increased and the sharpness of the edge 66 may be increased as well.

The edge portion may be hardened in order to increase a lifespan of the orifice cavitation device 38. The hardness of the edge portion 74 may be by way of example and not limitation between 58 Hardness on Rockwell scale C (HRC) and 64 HRC.

Referring now to FIGS. 3-8B, various embodiments of the orifice cavitation device 38a-f are shown. The alternative orifice cavitation devices 38a-d, f increase the length of the edge 66a-d,f over the edge 66 shown in FIG. 2B. This is accomplished by providing a plurality of notches 76a-d about the circumference of the downstream opening 50a-e. Moreover, these notches 76a-d may be formed as groove 78a-d in the surface 58 of the cone shaped funnel 46. The alternative orifice cavitation device 38e does not have a notch 76 but does have a groove 78e in the surface 58e of the funnel 46. The width 80a-e of the grooves may be between one half inch and one eighth inch and is preferably a quarter inch wide. A depth 82a-e of the grooved maybe between 0.05 inches and one half inch, and is preferably between 0.13 inches and 0.25 inches.

Figure 8:
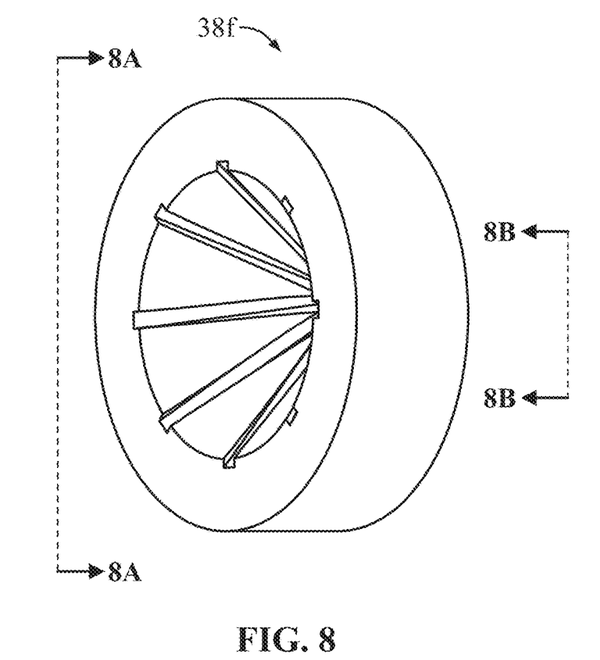
FIG. 8 is a perspective view of a sixth orifice cavitation device.
Figure 8A:
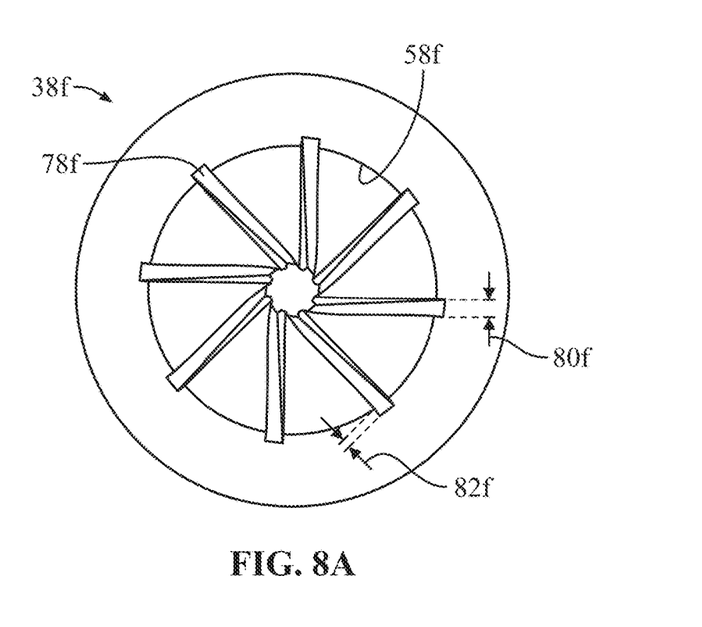
FIG. 8A is a front view of the sixth orifice cavitation device shown in FIG. 8.
Figure 8B:
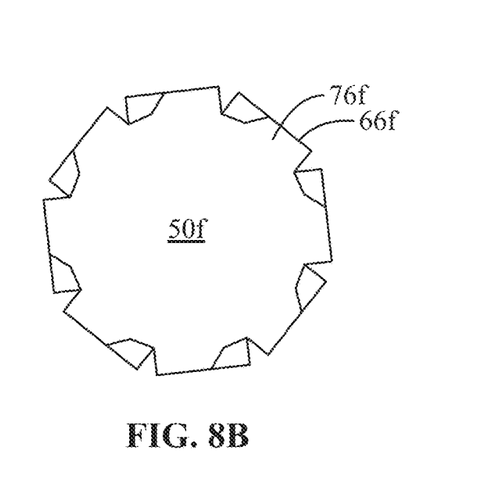
FIG. 8B is a rear view of the sixth orifice cavitation device shown in FIG. 8.

The depth 80a and width 82a of the grooves 78a may be constant from the upstream opening 48 to the downstream opening 50. However, it is also contemplated that the width and depth of the grooves may vary. By way of example and not limitation, the width and depth of the grooves may narrow as it proceeds from the upstream opening 48 to the downstream opening 50. The narrowing maybe linear, progressive or exponential. Moreover, the grooves may be straight or twisted as shown in FIGS. 8, 8A and 8B. The embodiment shown in FIGS. 8-8B is identical to the embodiment shown in FIGS. 5-5B except that the opening 50f is smaller compared to opening 50c, the rotation of the liquid through the device 38c is counterclockwise whereas the rotation of the liquid through the device 38f is clockwise due to the angular slant of the grooves 78c and 78f in the surface 58c and 58f.

Figure 3:
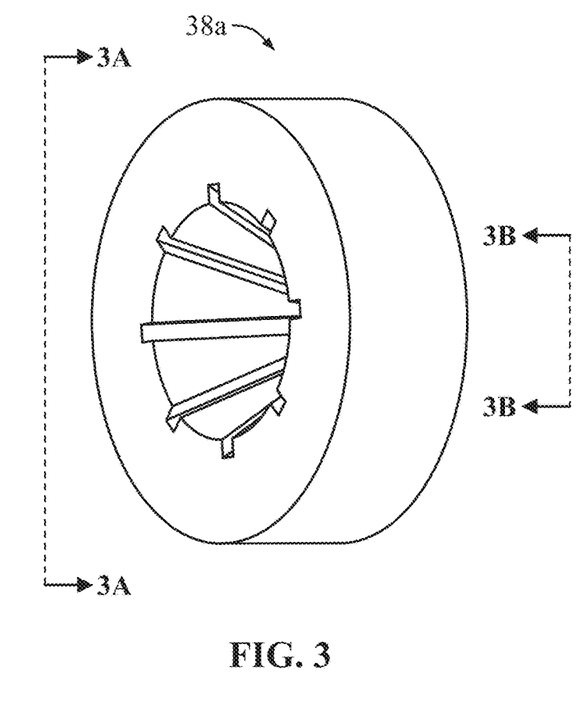
FIG. 3 is a perspective view of a first orifice cavitation device.
Figure 3A:
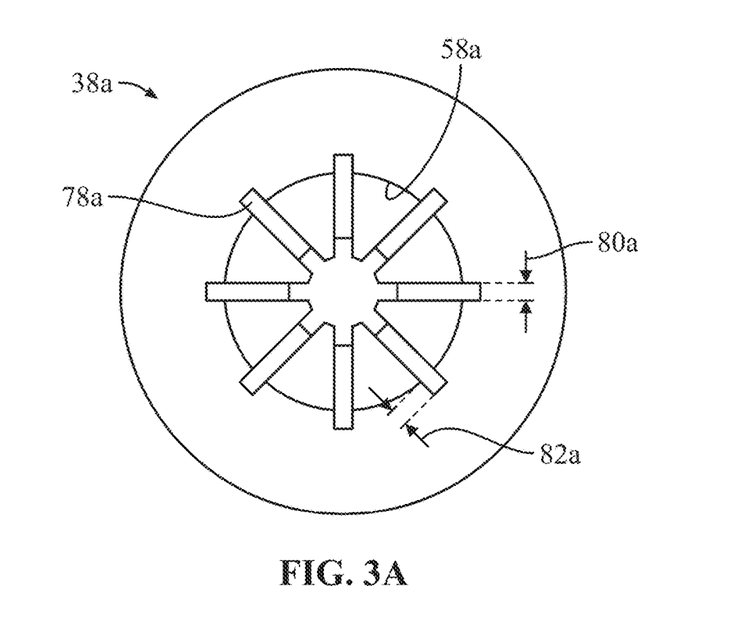
FIG. 3A is a front view of the first orifice cavitation device shown in FIG. 3.
Figure 3B:
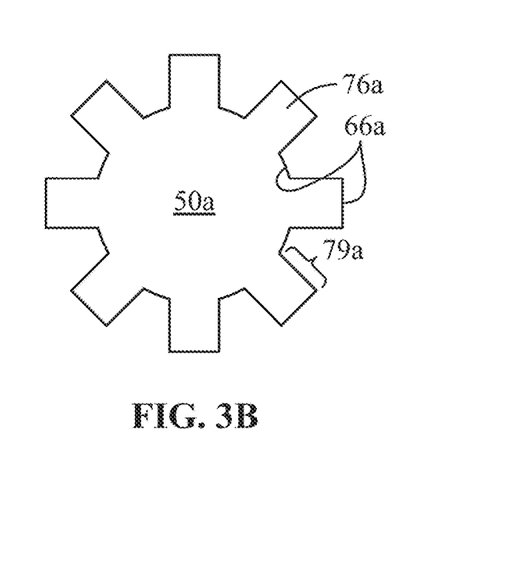
FIG. 3B is a rear view of the first orifice cavitation device shown in FIG. 3.

Referring now specifically to FIGS. 3-3B the grooves 78a may be linearly formed in the surface 58a. In this regard, the grooves of 78a do not rotate the water as it passes through the orifice cavitation device 38A. FIG. 3 shows a perspective view of the orifice cavitation device 38a. FIG. 3A shows an upstream view of the orifice cavitation device 38a. FIG. 3B shows only the opening 50a. The grooves 78a are straight and define a width 80a. The inner perimeter 66a of the opening 50a may be notched 79a. The notches increase an inner perimeterial length of the opening 50a to add more shearing length.

Figure 4:
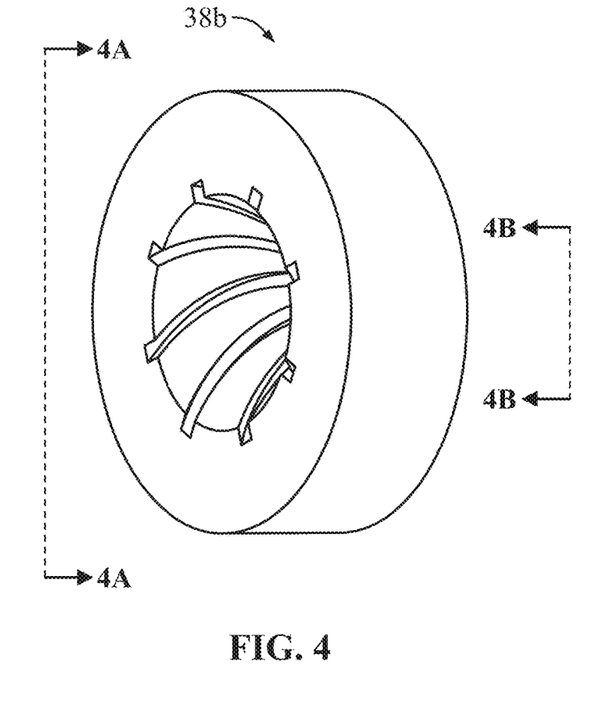
FIG. 4 is a perspective view of a second orifice cavitation device.
Figure 4A:
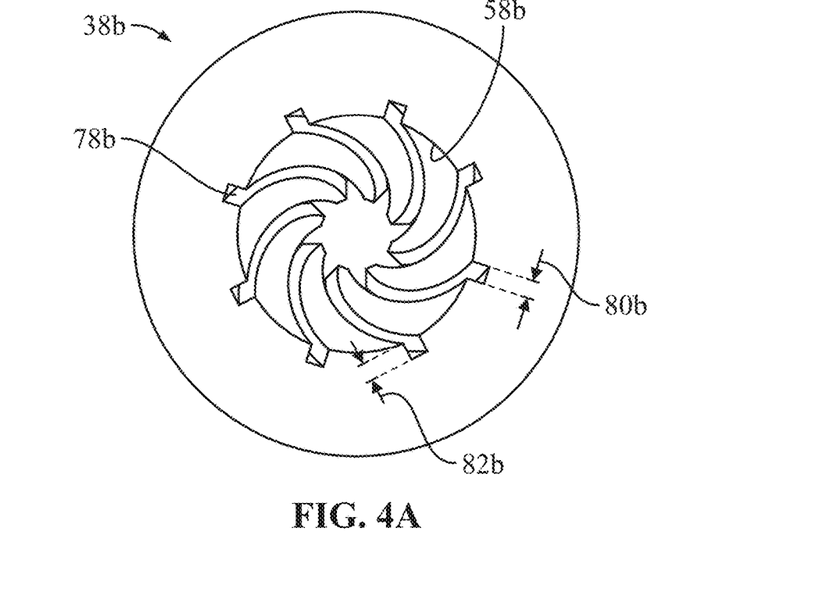
FIG. 4A is a front view of the second orifice cavitation device shown in FIG. 4.
Figure 4B:
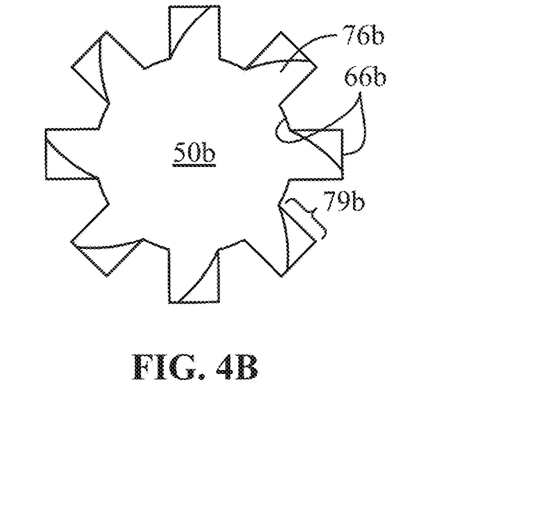
FIG. 4B is a rear view of the second orifice cavitation device shown in FIG. 4.

Referring now to FIG. 4-4B, the groove 78B may have a spiral configuration in a clockwise direction as shown in FIG. 4A. However, a counterclockwise spiral configuration is also contemplated. In this regard, the groves 78B rotate the water as it passes through the orifice cavitation device 38B. The rotation of the water adds additional shearing forces to facilitate cavitation. The notches 76B that are formed may be formed in a radial array about central axis of the orifice cavitation device 38b.

Figure 5:
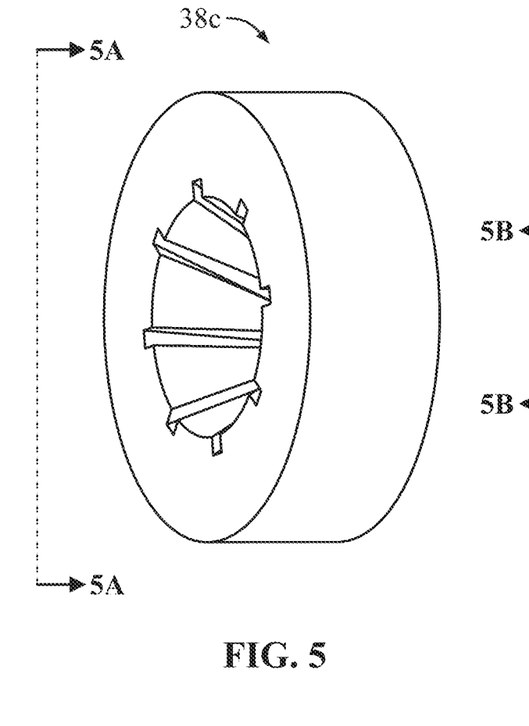
FIG. 5 is a perspective view of a third orifice cavitation device.
Figure 5A:
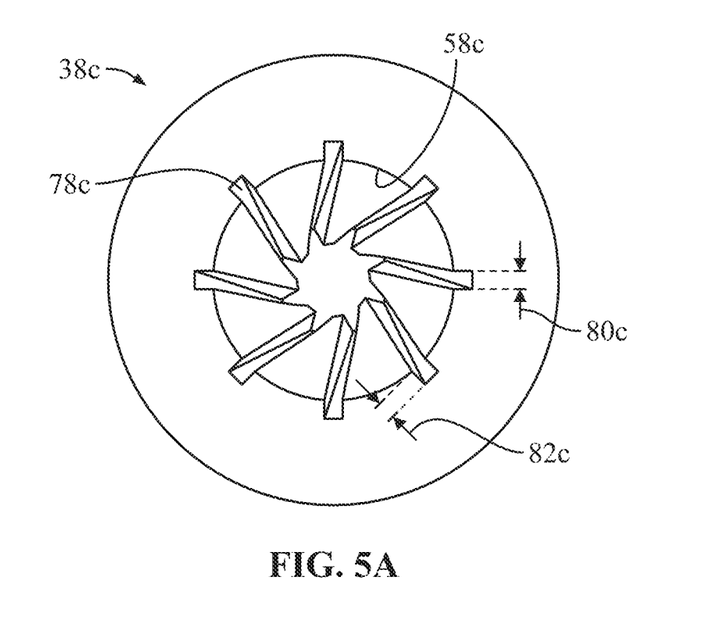
FIG. 5A is a front view of the third orifice cavitation device shown in FIG. 5.
Figure 5B:
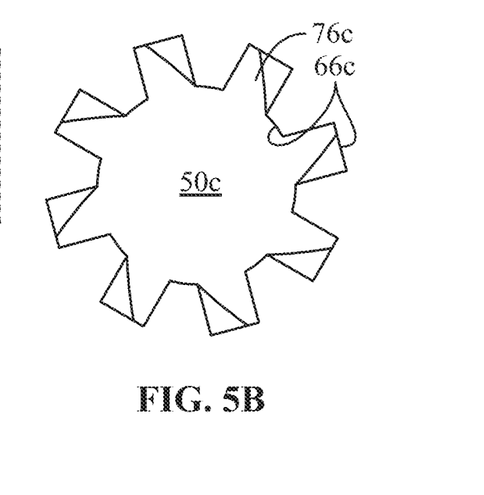
FIG. 5B is a rear view of the third orifice cavitation device shown in FIG. 5.

Referring now to FIGS. 5-5B, the grooves are slanted to rotate the water and create additional shearing forces. However, the grooves are straight but also twisted along their linear axis.

Figure 6:
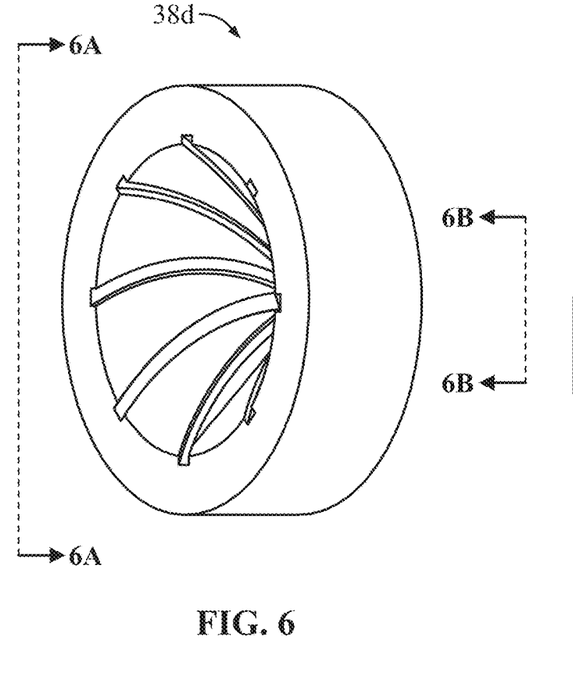
FIG. 6 is a perspective view of a fourth orifice cavitation device.
Figure 6A:
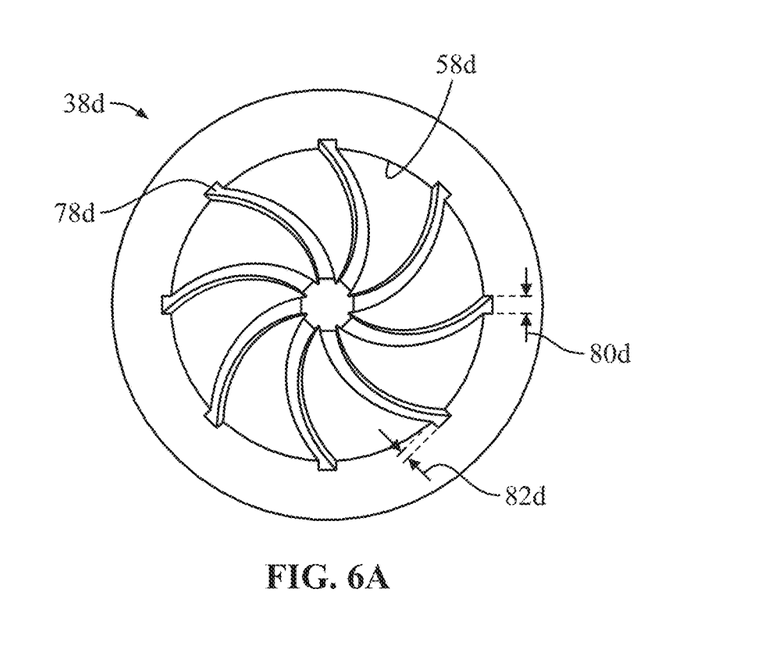
FIG. 6A is a front view of the fourth orifice cavitation device shown in FIG. 6.
Figure 6B:
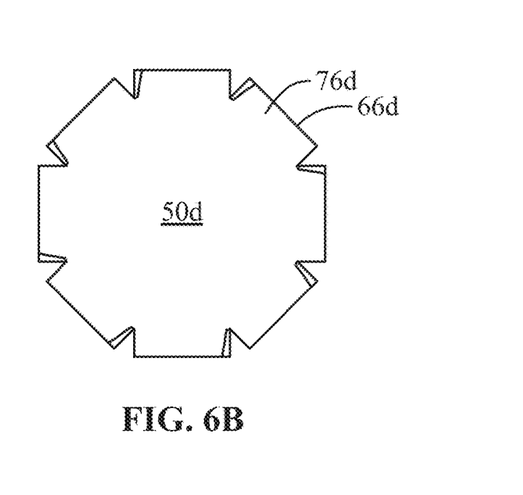
FIG. 6B is a rear view of the fourth orifice cavitation device shown in FIG. 6.

Referring now to FIG. 6-6B, the grooves are curved. However, it has a different size compared to FIGS. 4-4B.

Figure 7:
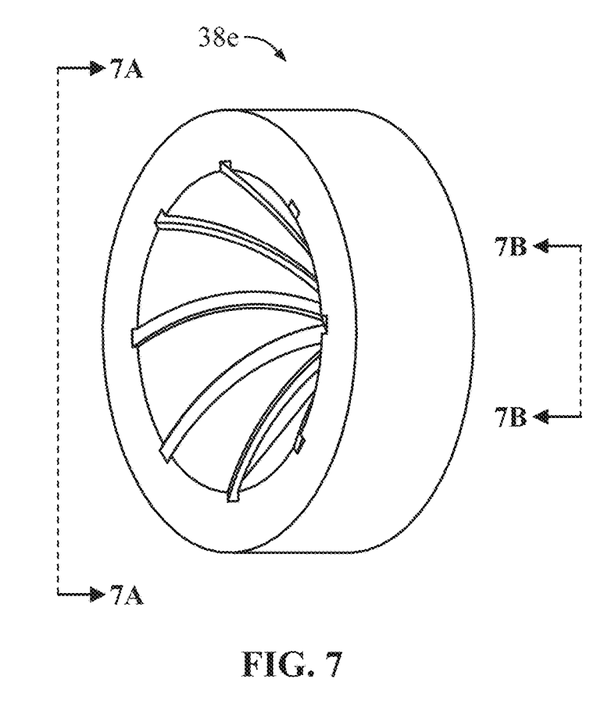
FIG. 7 is a perspective view of a fifth orifice cavitation device.
Figure 7A:
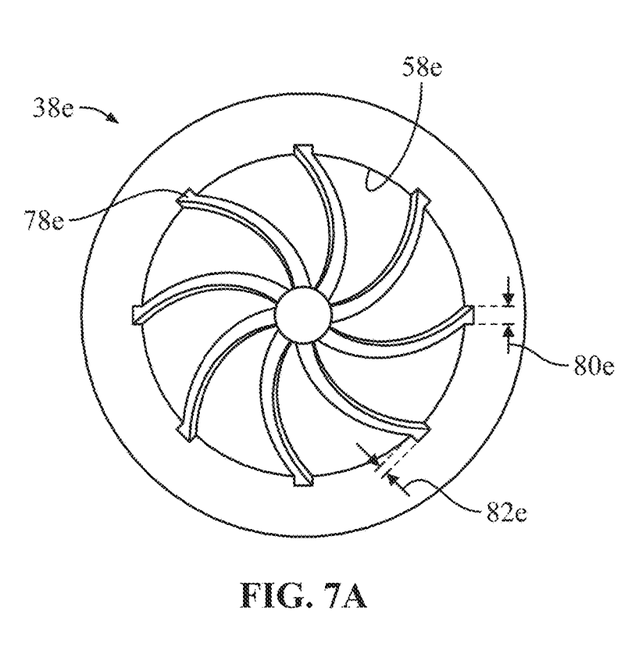
FIG. 7A is a front view of the fifth orifice cavitation device shown in FIG. 7.
Figure 7B:
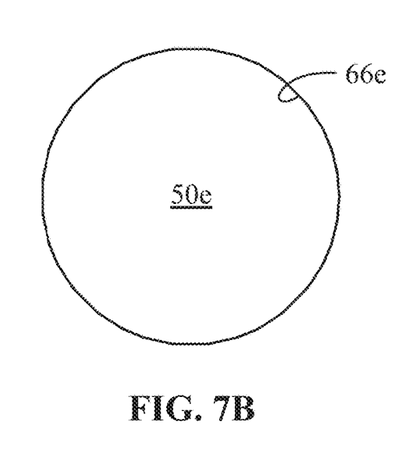
FIG. 7B is a rear view of the fifth orifice cavitation device shown in FIG. 7.

Referring now to FIG. 7-7B, the grooves has a spiral configuration but the opening 50c is not notched compared to opening 50a-d which are notched.

Figure 9:
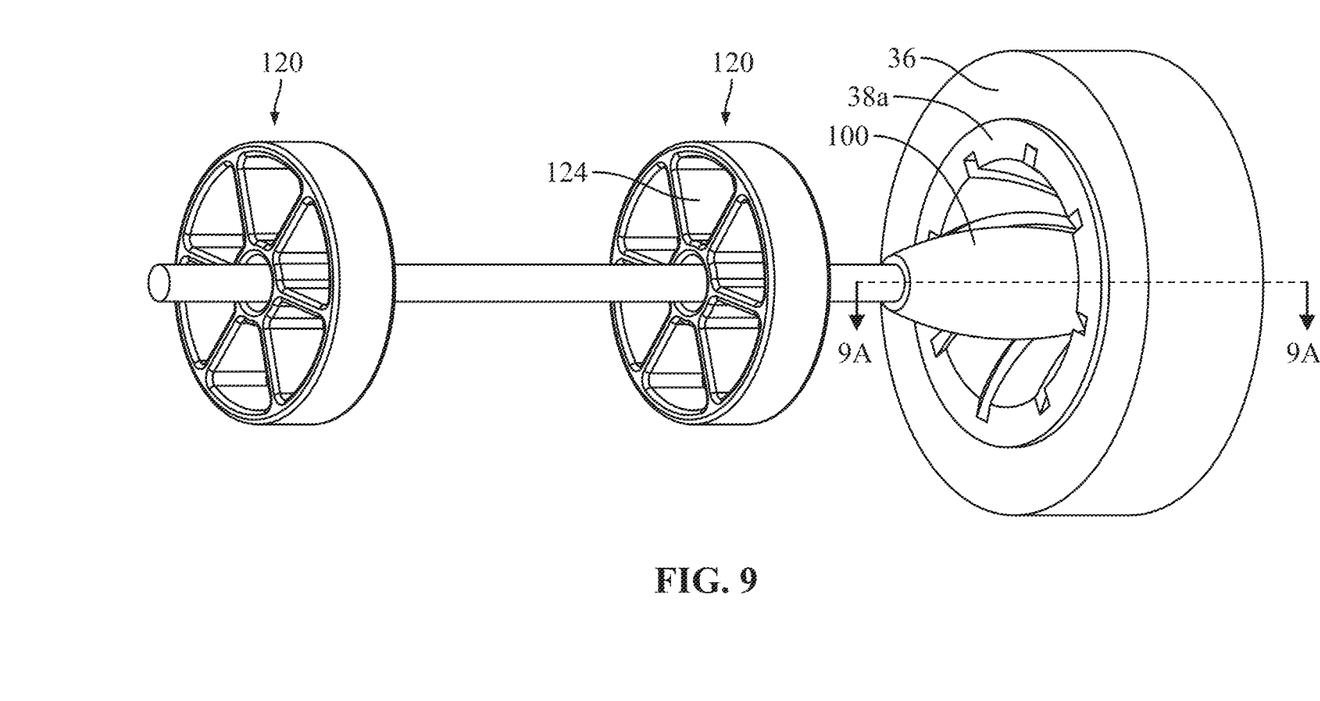
FIG. 9 is an assembled perspective view of a volume spacer which may be disposed in any one of the orifice cavitation devices disclosed herein.
Figure 9A:
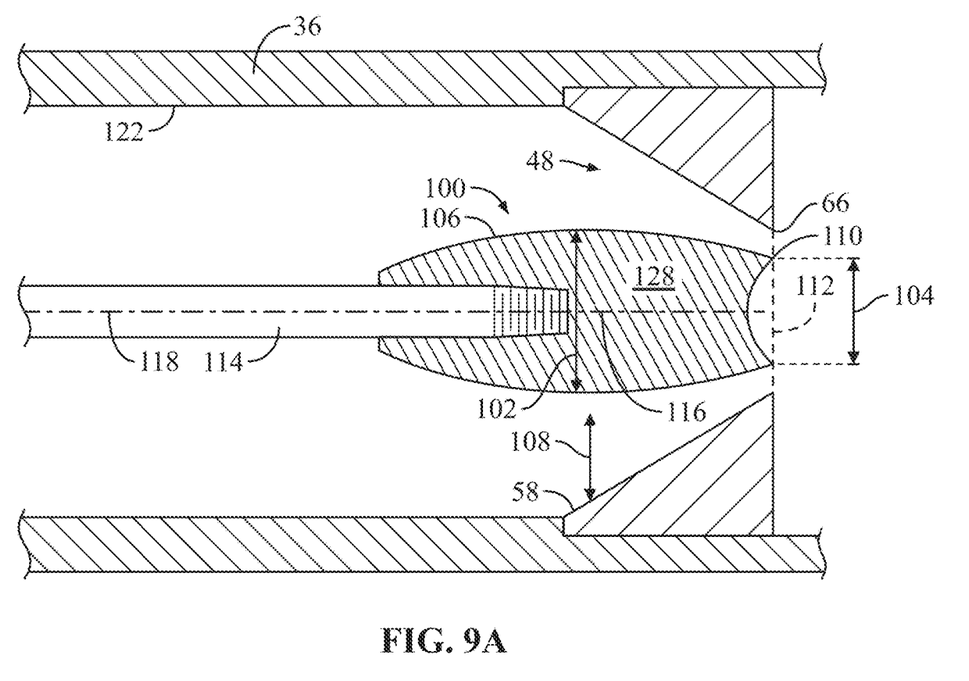
FIG. 9A is a cross sectional view of the volume spacer and orifice cavitation device shown in FIG. 9.
Figure 10:
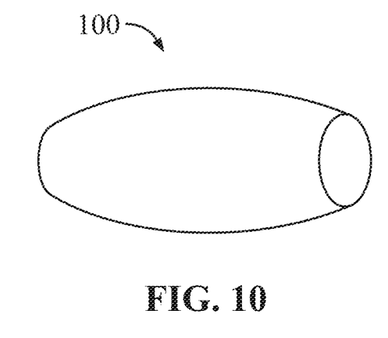
FIG. 10 is a perspective view of the volume spacer shown in FIG. 10.
Figure 11:
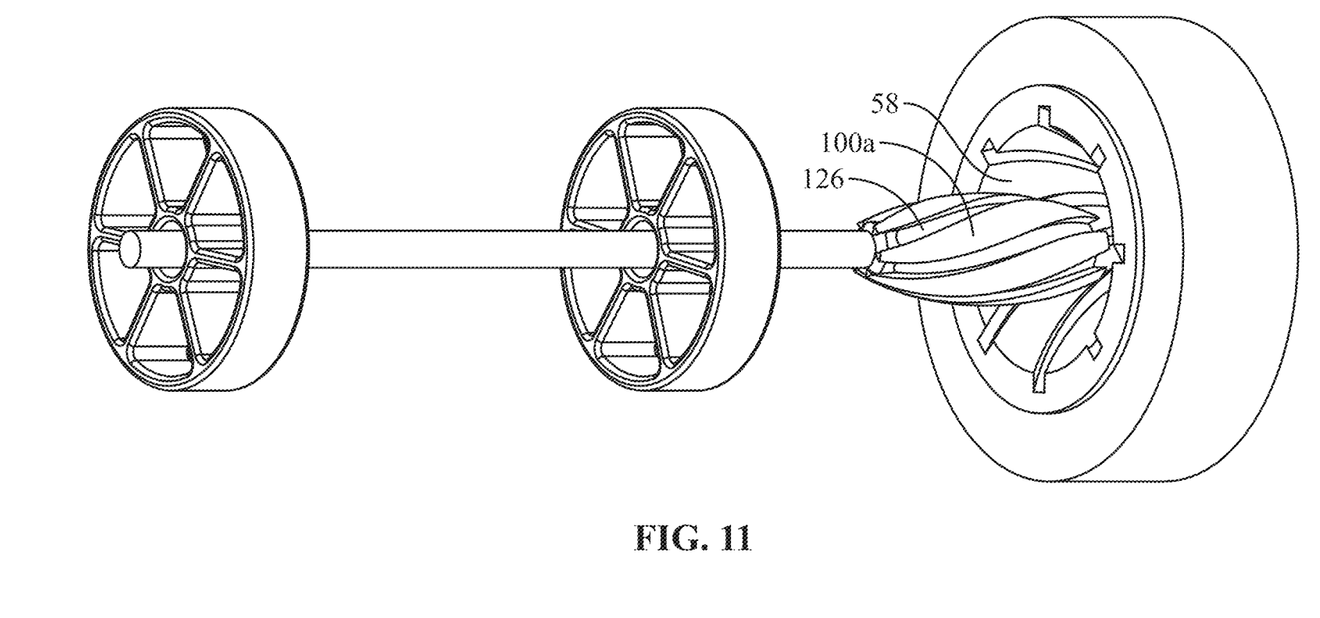
FIG. 11 is a perspective view of a volume spacer with grooves with a direction opposite grooves formed in a surface of a cone shaped funnel of any of the orifice cavitation devices disclosed herein.

Referring now to FIGS. 9-11, a volume spacer 100, 100A may be inserted into a space defined by the surface 58 of the cone shaped funnel of 46. By doing so, the speed or the velocity of the water is further increased provided that the pressure of the water upstream of the orifice cavitation device 38 is the same. Preferably, the volume spacer 100 is curved. Moreover, it is also contemplated that the surface 58 may match the curvature of the exterior surface 128 of the volume spacer 100. The volume spacer 100a is identical to the volume spacer 100 but it has grooves 126. In this regard, the surface 58 shown in FIG. 11 may match the curvature of the exterior surface of the volume spacer 100a. A diameter 102 of the volume spacer 100 may be greater at the upstream opening 48 compared to a diameter 104 at a distal end of the volume spacer 100. The diameter of the volume spacer 100 may be linearly smaller, progressively smaller or exponentially smaller from the diameter 102 to the diameter 104. It is preferred that a distance from an exterior surface 106 of the volume spacer 100 to the surface 58 of the cone shaped funnel 56 maybe become progressively smaller (e.g., linearly, exponentially) from the upstream side to the downstream side of the orifice cavitation device 38. The volume spacer 100 may be aligned so that it's distal end 110 is in the same plane at 112 defined by the edge 66. It is also contemplated that the distal end 110 may protrude further downstream or may be retracted toward the upstream side of the orifice cavitation device 38 by moving a shaft 114 forward or backwards along the axial direction of the pipe 36.

As discussed previously, the openings 48, 50 may define a center and may be coaxially aligned with a central axis of the pipe 36. Moreover, the volume spacer 100 may also define a central axis 116 which may also be coaxially aligned with a center of the openings 48, 50 and the central axis of the pipe 36. Moreover, the volume spacer 100 is mounted to the shaft 114 which also may define a central axis 118 which may also be coaxially aligned with the central axis 116. The volume spacer 100 maybe held centrally within the pipe 36 by mounting the shaft 114 on support spacers 120 (8). The support discs are mounted to the inner surface 122 (9) of the pipe 36. These support discs 120 may also allow fluid to flow through or between the webs 124.

Referring now to FIG. 11, the volume spacer 100 may also have grooves 126 which have a spiral configuration and spirals in the opposite direction as the grooves 78 of the orifice cavitation device 38.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A reverse osmosis plant for producing potable water from nonpotable water, the reverse osmosis plant comprising:
 a hydrodynamic cavitation unit which receives the nonpotable water and outputs cavitated nonpotable water from an output port, the nonpotable water pressurized to a pressure below 100 pounds per square inch throughout an entire flow path of the hydrodynamic cavitation unit, the hydrodynamic cavitation unit comprising:
  a body having a cone shaped funnel with an orifice disposed at a downstream side of the body, the orifice having an edge for facilitating a cavitation of the nonpotable water as the nonpotable water flows downstream of the edge of the orifice, the pressure of the nonpotable water being below 100 pounds per square inch before and after water flow through the orifice, wherein the cone shaped funnel has one or more grooves in a sidewall thereof that extend from an upstream side of the body to the edge of the orifice; and
  a bulbous body defining a proximal end, a distal end and a central axis, the central axis of the bulbous body coaxially aligned to a central axis of the cone shaped funnel of the body, the distal end of the bulbous body aligned to the edge of the orifice, wherein the bulbous body has one or more grooves that extend lengthwise along the central axis of the bulbous body;
 a pump connected to the output port of the hydrodynamic cavitation unit for receiving the cavitated nonpotable water, the pump having an output port for delivering the cavitated nonpotable water at a pressure greater than 200 pounds per square inch;
 a reverse osmosis unit connected to the output port of the pump for receiving the cavitated nonpotable water at a pressure greater than 200 pounds per square inch and producing the potable water.

2. The reverse osmosis plant of claim 1 wherein the cone shaped funnel terminates at the edge.

3. The reverse osmosis plant of claim 1 wherein the one or more grooves of the cone shaped funnel is straight.

4. The reverse osmosis plant of claim 1 wherein the one or more grooves of the cone shaped funnel has a spiral configuration.

5. The reverse osmosis plant of claim 4 wherein a radius of the spiral configuration of the one or more grooves of the cone shaped funnel increases from an edge of an upstream side of the body.

6. The reverse osmosis plant of claim 5 wherein the increase is linear or progressive.

7. The reverse osmosis plant of claim 1 wherein the one or more grooves on the bulbous body are straight.

8. The reverse osmosis plant of claim 1 wherein the one or more grooves on the bulbous body has a spiral configuration.

9. The reverse osmosis plant of claim 8 wherein the one or more grooves of the cone shaped funnel has a spiral configuration and a direction of the spiral configuration of the one or more grooves of the bulbous body is opposite a direction of the spiral configuration of the one or more grooves of the cone shaped funnel.

10. A hydrodynamic cavitation unit which cavitates nonpotable water, the hydrodynamic cavitation unit comprising:
 a body having a cone shaped funnel with an orifice disposed at a downstream side of the body, the orifice having an edge for facilitating a cavitation of the nonpotable water as the nonpotable water flows downstream of the edge of the orifice, a pressure of the nonpotable water being below 100 pounds per square inch before and after water flow through the orifice, wherein the cone shaped funnel has one or more grooves in a sidewall thereof that extend from an upstream side of the body to the edge of the orifice; and
 a bulbous body defining a proximal end, a distal end and a central axis, the central axis of the bulbous body coaxially aligned to a central axis of the cone shaped funnel of the body, the distal end of the bulbous body aligned to the edge of the orifice, wherein the bulbous body has one or more grooves that extend lengthwise along the central axis of the bulbous body.

11. The hydrodynamic cavitation unit of claim 10 wherein the cone shaped funnel terminates at the edge.

12. The hydrodynamic cavitation unit of claim 10 wherein the one or more grooves of the cone shaped funnel is straight.

13. The hydrodynamic cavitation unit of claim 10 wherein the one or more grooves of the cone shaped funnel has a spiral configuration.

14. The hydrodynamic cavitation unit of claim 13 wherein a radius of the spiral configuration of the one or more grooves of the cone shaped funnel increases from an edge of an upstream side of the body.

15. The hydrodynamic cavitation unit of claim 14 wherein the increase is linear or progressive.

16. The hydrodynamic cavitation unit of claim 10 wherein the one or more grooves on the bulbous body are straight.

17. The hydrodynamic cavitation unit of claim 10 wherein the one or more grooves on the bulbous body has a spiral configuration.

18. The hydrodynamic cavitation unit of claim 17 wherein the one or more grooves of the cone shaped funnel has a spiral configuration and a direction of the spiral configuration of the one or more grooves of the bulbous body is opposite a direction of the spiral configuration of the one or more grooves of the cone shaped funnel.

* * * * *